(12) United States Patent
Strecker et al.

(10) Patent No.: US 8,092,153 B2
(45) Date of Patent: Jan. 10, 2012

(54) BYPASS AIR SCOOP FOR GAS TURBINE ENGINE

(75) Inventors: Steven Strecker, Erin (CA); Hong-Wei Hui, Toronto (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 608 days.

(21) Appl. No.: 12/335,660

(22) Filed: Dec. 16, 2008

(65) Prior Publication Data

US 2010/0150700 A1 Jun. 17, 2010

(51) Int. Cl.
*F01D 11/24* (2006.01)
(52) U.S. Cl. ............... 415/115; 415/117; 415/173.2; 415/176; 415/178
(58) Field of Classification Search ............ 415/144, 415/145, 115, 116, 117, 173.2, 176–178
See application file for complete search history.

(56) References Cited

U.S. PATENT DOCUMENTS

| | | | |
|---|---|---|---|
| 3,100,964 A * | 8/1963 | Bevers al. ................ | 415/26 |
| 4,069,662 A | 1/1978 | Redinger, Jr. et al. | |
| 4,245,953 A | 1/1981 | Milton et al. | |
| 4,280,678 A | 7/1981 | Roberts | |
| 4,304,093 A | 12/1981 | Schulze | |
| 4,338,061 A | 7/1982 | Beitler et al. | |
| 4,441,314 A | 4/1984 | Fitton | |
| 4,449,544 A | 5/1984 | Soderberg | |
| 4,474,001 A | 10/1984 | Griffin et al. | |
| 4,574,585 A | 3/1986 | Conn | |
| 4,841,726 A | 6/1989 | Burkhardt | |
| 4,856,272 A | 8/1989 | Putman et al. | |
| 5,038,560 A | 8/1991 | Seed | |
| 5,043,558 A * | 8/1991 | Byles ...................... | 219/201 |
| 5,048,288 A | 9/1991 | Bessette et al. | |
| 5,113,649 A | 5/1992 | Siedlecki, Jr. | |
| 5,165,847 A | 11/1992 | Proctor et al. | |
| 5,261,228 A | 11/1993 | Shuba | |
| 5,279,109 A | 1/1994 | Liu et al. | |
| 5,316,437 A * | 5/1994 | Czachor .................. | 415/115 |
| 5,351,473 A | 10/1994 | Shuba | |
| 5,351,732 A | 10/1994 | Mills et al. | |
| 5,380,151 A | 1/1995 | Kostka et al. | |
| 5,477,673 A | 12/1995 | Blais et al. | |
| 5,557,920 A | 9/1996 | Kain | |
| 5,692,370 A | 12/1997 | Stuhlmuller et al. | |
| 5,871,333 A | 2/1999 | Halsey | |
| 6,070,406 A | 6/2000 | Lenertz et al. | |
| 6,122,905 A | 9/2000 | Liu | |
| 6,178,737 B1 | 1/2001 | Lenertz et al. | |
| 6,226,977 B1 | 5/2001 | Ichiryu et al. | |
| 6,625,989 B2 | 9/2003 | Boeck | |
| 6,701,716 B2 | 3/2004 | Rayer et al. | |
| 6,755,025 B2 | 6/2004 | Eleftheriou et al. | |
| 6,810,667 B2 | 11/2004 | Jung et al. | |
| 6,817,189 B2 | 11/2004 | Boeck | |

(Continued)

*Primary Examiner* — Benjamin Sandvik
*Assistant Examiner* — Krista Soderholm
(74) *Attorney, Agent, or Firm* — Norton Rose or LLP

(57) ABSTRACT

A gas turbine engine has a plurality of radial struts in a bypass duct. At least one strut has a scoop incorporated with the fairing of the strut and in communication with an air passage of an engine secondary air system. The scoop faces a bypass air flow to scoop a portion of the bypass air flow using available dynamic pressure in the bypass duct. Scooped air may be provided, for example, to an active tip clearance control apparatus in a long duct turbofan engine.

15 Claims, 7 Drawing Sheets

U.S. PATENT DOCUMENTS

| | | |
|---|---|---|
| 7,093,418 B2 * | 8/2006 | Morris et al. ............... 60/39.08 |
| 7,240,691 B2 | 7/2007 | Bevan |
| 7,269,955 B2 | 9/2007 | Albers et al. |
| 7,340,880 B2 | 3/2008 | Magoshi et al. |
| 7,347,661 B2 | 3/2008 | Phipps et al. |
| 7,811,050 B2 * | 10/2010 | Roth ............................ 415/58.5 |
| 2007/0276578 A1 | 11/2007 | Herron et al. |
| 2008/0080967 A1 | 4/2008 | Urbassik et al. |
| 2008/0112797 A1 | 5/2008 | Seitzer et al. |
| 2008/0112798 A1 | 5/2008 | Seitzer et al. |
| 2010/0150700 A1 * | 6/2010 | Strecker et al. ............... 415/116 |

* cited by examiner

BYPASS AIR SCOOP FOR GAS TURBINE ENGINE

TECHNICAL FIELD

The application relates generally to a gas turbine engine and more particularly, to a secondary air system of a gas turbine engine which scoops bypass air flow from a bypass duct.

BACKGROUND OF THE ART

"Active tip clearance" refers to a gas turbine engine system whereby the radial gap between the turbine blades and surrounding static shroud is varied during the engine cycle in order to optimize tip clearance. Active tip clearance control (ATCC) usually uses compressor or bypass air to selectively cool the turbine shrouds to affect tip clearance. The use of bypass air is preferred because it is less thermodynamically "expensive" for the engine (i.e. more efficient). However, bypass air which is driven by a fan assembly is at a much lower pressure than air bled from the compressor assembly (e.g. P3 air) of the gas turbine engine. For a gas turbine engine application with a short duct nacelle, prior art utilizes a port on the side of the fan air stream bypass duct, to tap off air and deliver same through a pipe and a valve to its ultimate end use as turbine cooling air, after which it vents to the atmosphere. The valve is usually a butterfly style and has relatively high pressure losses. Therefore, long duct nacelle engines with a low pressure differential in the bypass air are challenged in using bypass air in an ATCC system because the sink pressure is higher than that of the atmosphere.

Accordingly, there is a need to provide an improved arrangement.

SUMMARY

In one aspect, there is provided a gas turbine engine which comprises a fan assembly, a compressor assembly, a combustion gas generator assembly, a turbine assembly and an annular bypass air duct for directing a bypass air flow driven by the fan assembly to pass therethrough, the annular bypass air duct being defined between an outer casing and an engine core casing which contains the compressor, combustion gas generator and turbine assemblies, a plurality of struts radially extending between the outer casing and the core casing, at least one of the struts forming an air fairing located in a stream of the bypass air flow, the at least one strut including an air scoop incorporated with the air fairing, the air scoop being defined at a mid span of the air fairing and facing the bypass air flow in order to scoop a portion of the bypass air flow at a maximum dynamic pressure available in the bypass air flow, the air scoop being in fluid communication with an air passage for directing the portion of the bypass air flow which is scooped in, to an engine component for cooling purposes.

In a second aspect, there is provided an active tip clearance control (ATCC) system of a gas turbine engine which comprises an cooling air passage extending from an annular bypass air duct to a turbine shroud for directing a portion of a bypass air flow to the turbine shroud for selectively cooling the turbine shroud; an air scoop incorporated in an air fairing of a strut radially extending within the annular bypass air duct and in fluid communication with the cooling air passage, the air scoop being defined at a mid span of the air fairing and facing the bypass air flow in order to scoop the portion of the bypass air flow into the cooling air passage with a maximum dynamic pressure available in the bypass air flow; a valve member for selectively completely opening and completely closing the air scoop; and means for controlling operation of the valve member to achieve active tip clearance control of the turbine shroud.

Further details of these and other aspects will be apparent from the detailed description and drawings included below.

DESCRIPTION OF THE DRAWINGS

Reference is now made to the accompanying drawings, in which.

DETAILED DESCRIPTION

Figure 1:
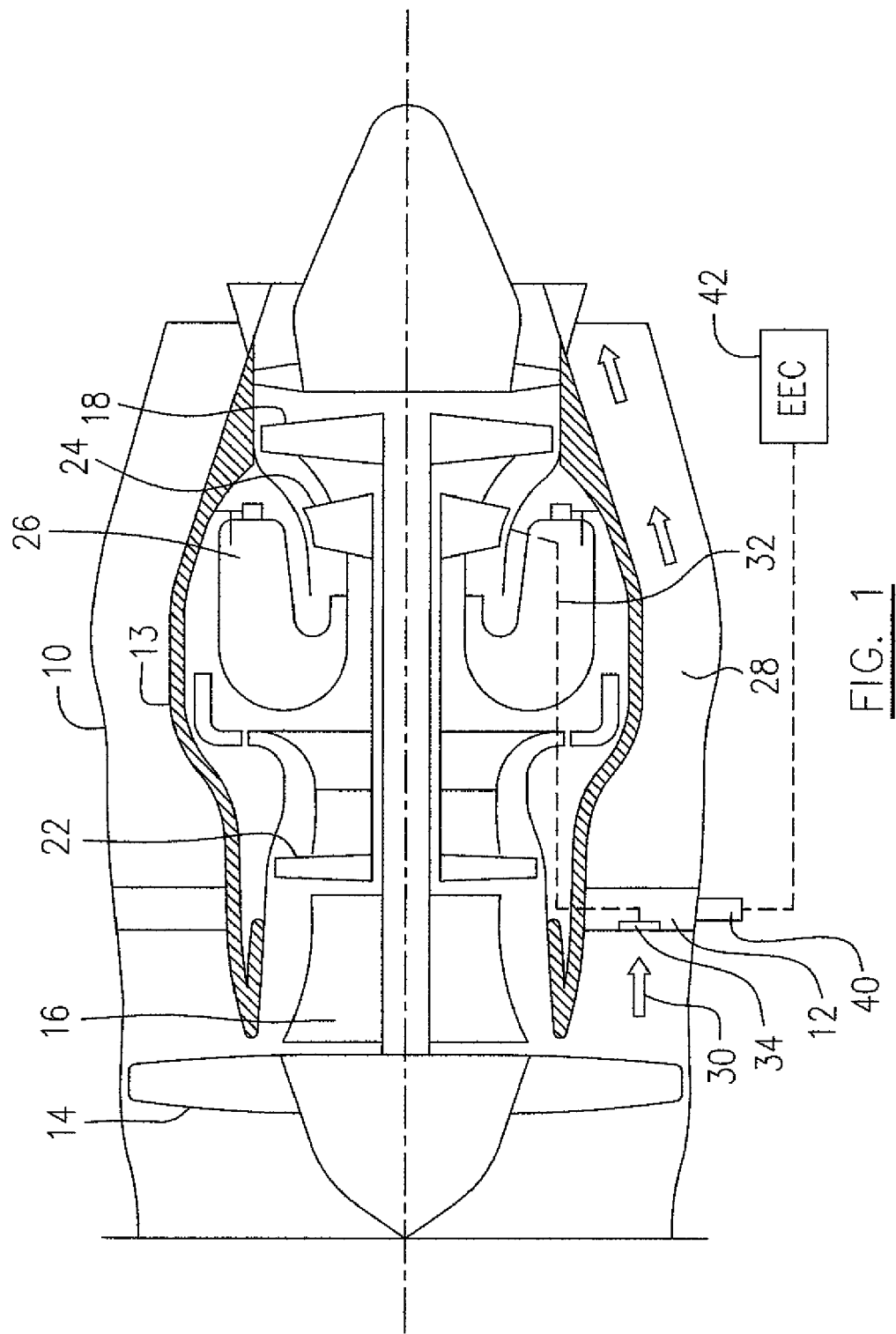
FIG. 1 is a schematic cross-sectional view of a turbofan gas turbine engine in accordance with the described concepts.

Referring to FIG. 1, a turbofan gas turbine engine includes a bypass air duct 10, a core casing 13, a low pressure spool assembly (not numbered) which includes a fan assembly 14, a low pressure compressor assembly 16 and a low pressure turbine assembly 18, and a high pressure spool assembly (not numbered) which includes a high pressure compressor assembly 22 and a high pressure turbine assembly 24. The core casing 13 surrounds the low and high pressure spool assemblies in order to define a main fluid path (not indicated) therethrough. In the main fluid path there is provided a combustion gas generator assembly 26. A plurality of struts 12 are positioned within an annular bypass air duct 28 and radially extend between the outer casing 10 and the core casing 13 which in combination define the annular bypass air duct 28. A bypass air flow (indicated by arrows 30) driven by the fan assembly 14, passes through the annular bypass air duct 28, exposing the radial struts 12 in a mid stream of the bypass air flow 30.

Referring to FIGS. 1-4, the turbofan gas turbine engine includes an active tip clearance control (ATCC) system which includes a cooling air passage 32 extending from the annular bypass air duct 28 to a turbine shroud such as the turbine shroud (not numbered) of the high pressure turbine assembly 24 as shown in FIG. 1, for selectively cooling same. It should be noted that the broken line indicated by reference numeral 32 in FIG. 1, schematically illustrates the cooling air passage but does not indicate the accurate location or physical position of the cooling air passage.

Figure 4:
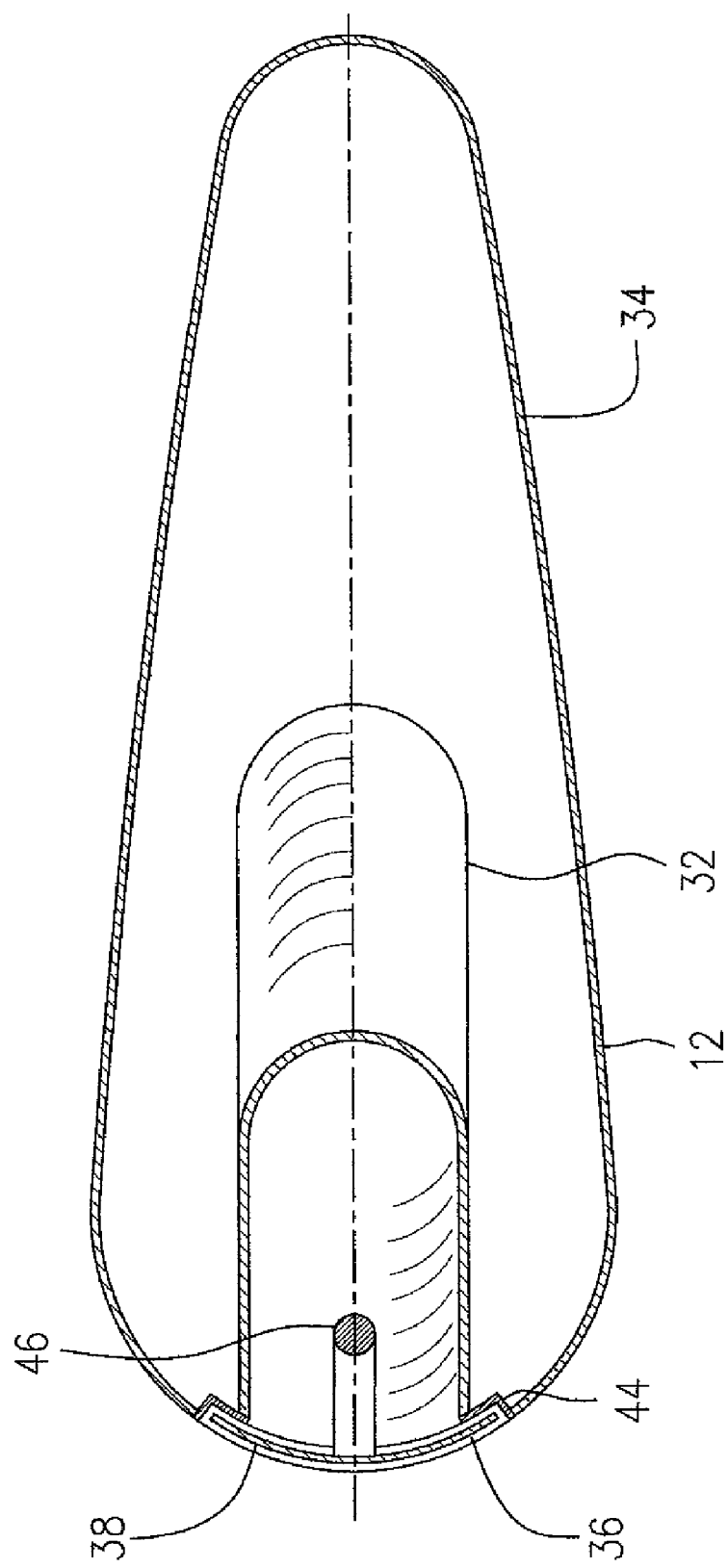
FIG. 4 is a cross-sectional view of the radial strut taken along line 4-4 in FIG. 3, showing the strut accommodating the air scoop.

The radial struts 12 which structurally connect the core casing 13 with engine components contained within the core casing 13 to the outer casing 10, usually each have a hollow configuration with a continuous circumferential wall 34. The continuous circumferential wall 34 is defined in an aerodynamic profile to form an air fairing as shown in FIG. 4 in order to reduce pressure losses of the bypass air flow 30 when the strut 12 is located in the stream of the bypass air flow 30.

At least one of the radial struts 12 is provided with an air scoop 36 which is incorporated in the air fairing of the strut 12 and is in fluid communication with the cooling air passage 32 an end section of which is accommodated within the hollow configuration of the radial strut 12. The air scoop 36 is defined at a mid span of the air fairing of the strut 12 and faces the bypass air flow 30 in order to scoop a portion of the bypass air flow 30 into the cooling air passage 32 with a maximum dynamic pressure available in the bypass air flow 30. In this embodiment, the air scoop 36 is an opening cut in a leading edge area of the fairing of the strut 12, and may be in any shape desired or convenient to roughly match the cross-section of the cooling air passage 32 which is directly connected to this opening (air scoop 36).

Figure 2:
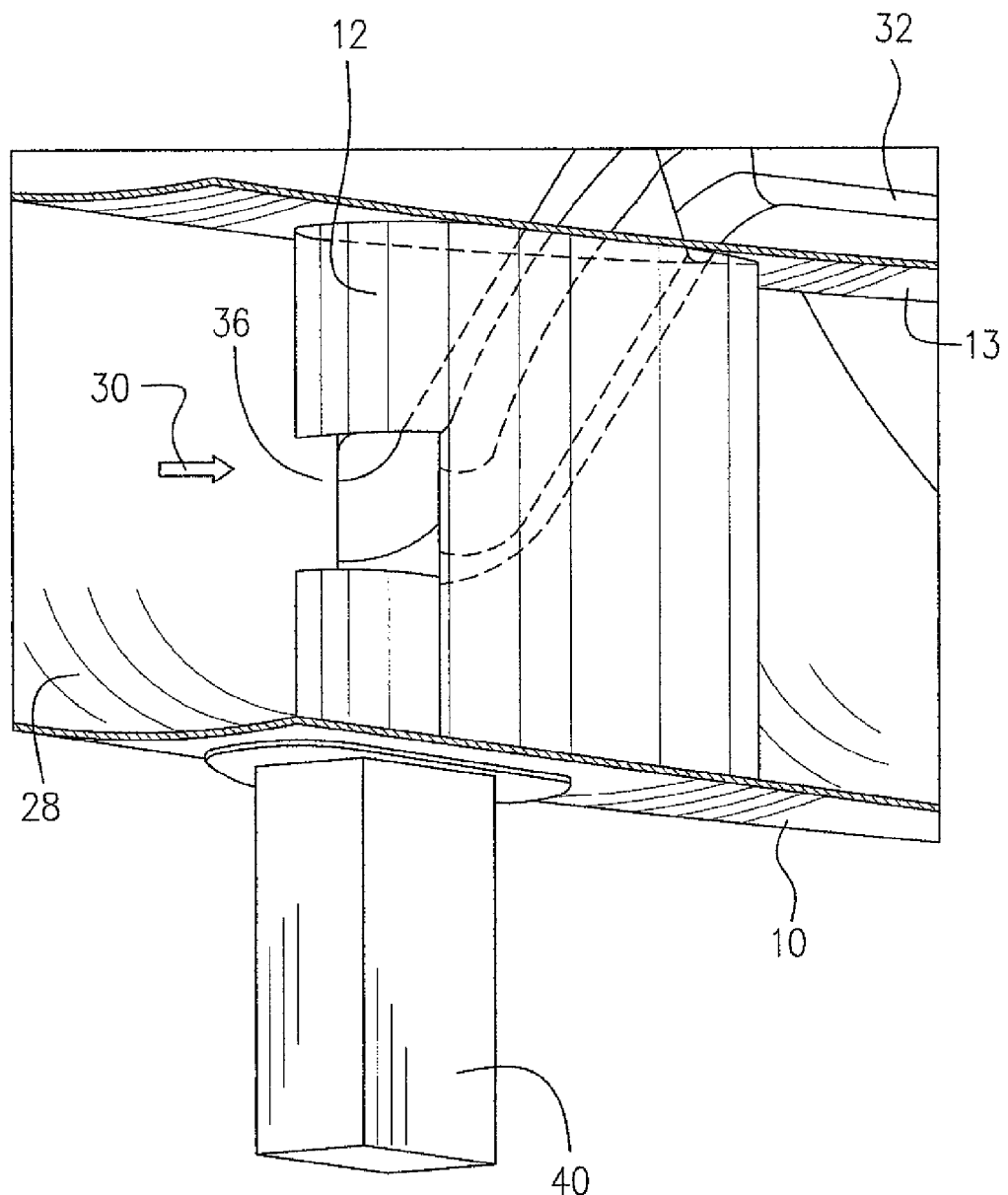
FIG. 2 is a partial perspective view of the turbofan gas turbine engine of FIG. 1 with a front portion cut away to show an air scoop incorporated in an air fairing of a radial strut extending in an annular bypass air duct of the engine, according to one embodiment.
Figure 3:
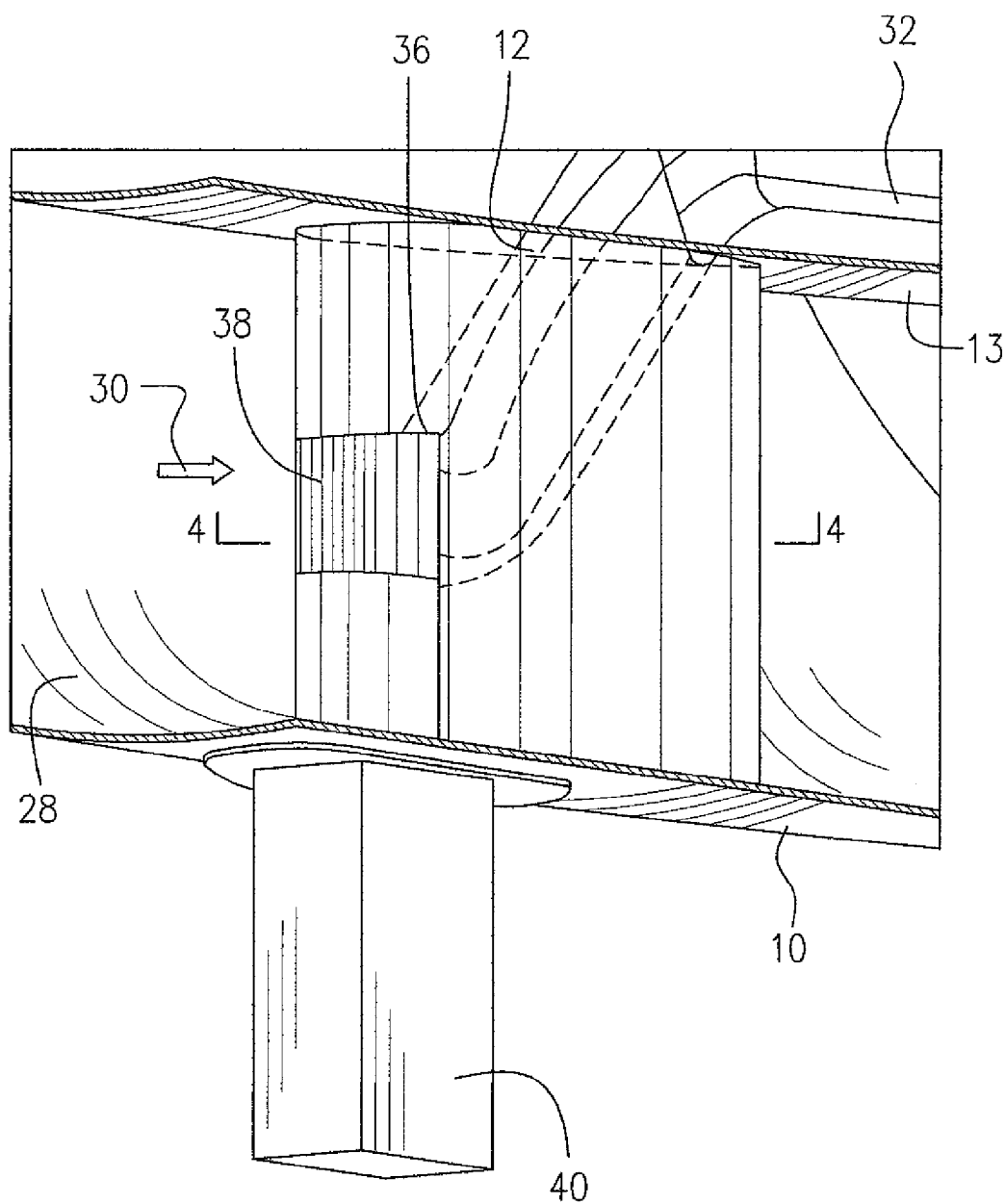
FIG. 3 illustrates the embodiment of FIG. 2 in a similar view, showing the air scoop in a closed position.

The air scoop 36 as illustrated in FIGS. 1-3 is defined in a radial strut 12 in a low position around the core casing 13, which should be understood to be solely for convenience of illustration. The at least one of the radial struts 12 which is provided with an air scoop 36 may in fact, be one of the radial struts 12 in any angular position around the core casing.

A valve member 38 is provided for selectively completely opening and completely closing the air scoop 36. FIG. 2 shows the air scoop 36 completely open and FIG. 3 shows the air scoop 36 completely closed. However, the valve member may be stopped at any in-between positions Means for controlling operation of the valve member 38 such as a valve actuator 40 is provided, which may be controlled by an engine electronic controller (EEC) 42 in order to achieve active tip clearance control for the turbine shroud.

It may be desirable to have the valve member 38 configured as a substantial part of the air fairing of the radial strut 12 when the valve member closes the opening (air scoop 36) defined in the radial strut 12. As more clearly shown in FIG. 4, the valve member 38 is configured in a shape substantially corresponding with the portion of the air fairing which is cut off from the fairings of the radial strut 12 to form the opening (air scoop 36) such that when the valve member 38 closes the opening (air scoop 36), the fairing of the radial strut 12 at its leading edge area is substantially similar to the leading edges of other radial struts 12 which do not include an air scoop.

In this embodiment, the valve member 38 is slidably attached to the inner side of the continuous circumferential wall 34 of the radial strut 12 at its leading edge area, by a pair of tracks 44 which radially extend along the opposed radial edges of the opening (air scoop 36) and are affixed to the inner side of the continuous circumferential wall 34. The cooling air passage 32 may be defined by a pipe, an inlet end section (not numbered) of which is housed within the continuous circumferential wall 34 of the radial strut 12. The inlet opening of the pipe (the cooling air passage 32) is aligned with the opening (air scoop 36) defined in the fairing of the radial strut 12 and is affixed to, for example, the pair of tracks 44.

The valve actuator 40 in this embodiment, is a linear actuator and has a linkage such as a rod 46 extending within the hollow configuration of the radial strut 12 to connect the radially slidable valve member 38 for operation while the valve actuator 40 is located outside of the annular bypass air duct 28, for example being attached to the outer side of the outer casing 10. When the valve actuator 40 is controlled by, for example EEC 42 to radially slide the valve member 38 along the tracks 44 to a position in which the opening (air scoop 36) is completely open (as shown in FIG. 2), thereby offering no obstruction to a portion of the bypass air flow that is captured by the air scoop 36. When the valve actuator 40 controlled for example by EEC 42 to radially slide the valve member 38 along the tracks 44 to a position in which the opening (air scoop 36) is completely closed (as shown in FIG. 3), there is no adverse impact to cause bypass duct air pressure losses because the valve member 38 forms part of the aerodynamic shape of the fairing where the air scoop 36 is defined. This design significantly reduces the pressure losses in the scooped cooling air relative to those of the typical butterfly valve installation used in the prior art, without adverse impact to the aerodynamic functions of the fairing of the struts.

It should be noted that consideration has been given to the design in view of icing conditions which may occur when the valve member 38 is closed. Therefore, the valve actuator 40 which may be conveniently driven, for example by hydraulic forces, has enough force margin to ensure that any ice can be shed.

Now referring to FIGS. 1 and 5-7, the ATCC system of the turbofan gas turbine engine of FIG. 1 may be alternatively provided with a rotatable valve member 38a and a rotary valve actuator 40a, performing a similar function to that of the slidable valve member 38 and the linear actuator 40 described in the previous embodiment with reference to FIGS. 1-4, which selectively completely opens and completely closes the air scoop 36 defined in the fairing of at least one of the radial struts 12. The valve member 38a is shaped substantially similar to the valve member 38 of FIG. 4 and the advantages thereof will not be repeated herein. Components and structures of this embodiment similar to those of the previously described embodiment with reference to FIGS. 1-4, are indicated by similar numeral references and the description thereof will not be repeated herein.

Further description will only be addressed to the structures and components for installation of the rotatable valve member 38a.

Figure 5:
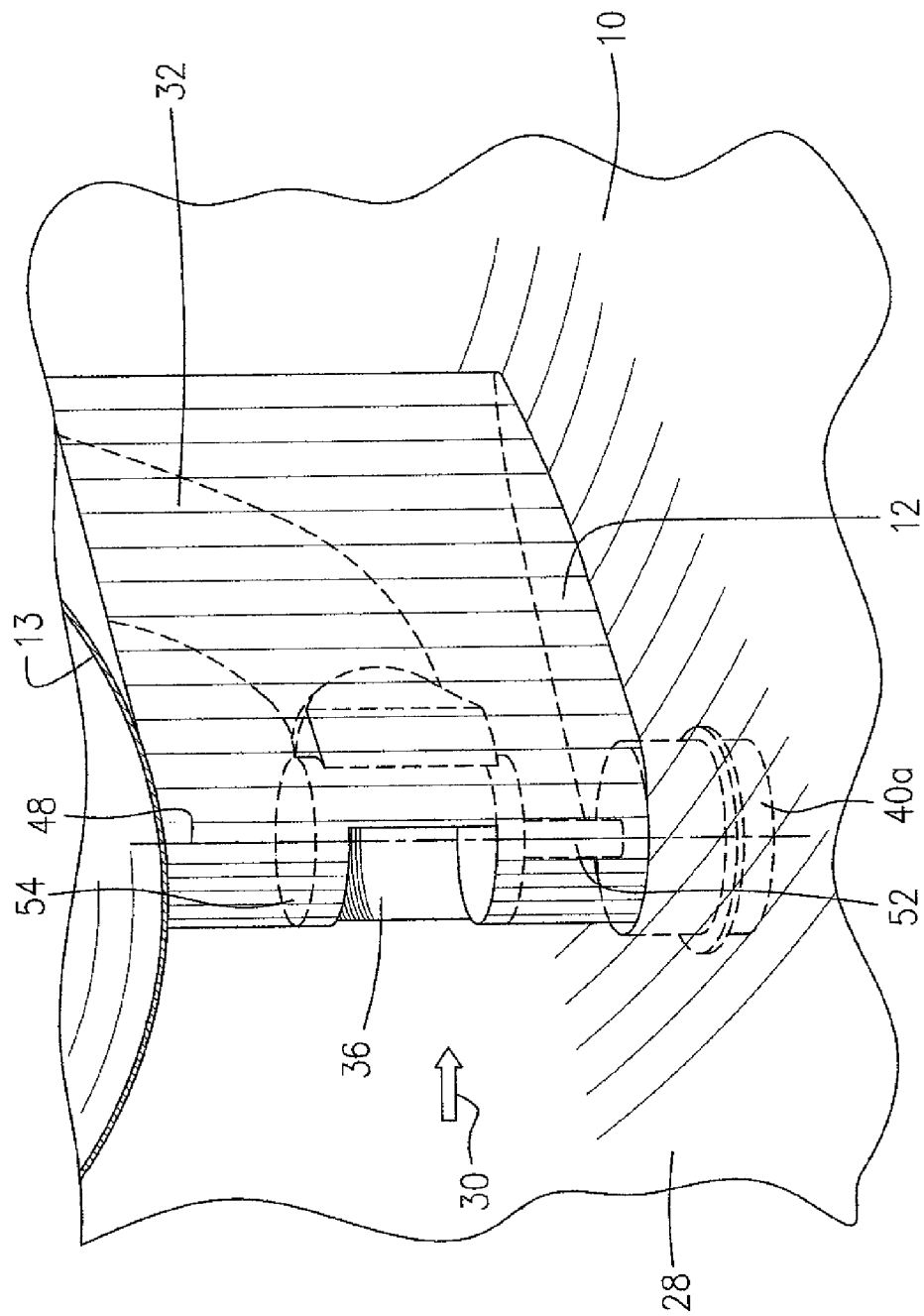
FIG. 5 is view similar to FIG. 2, showing another embodiment.
Figure 6:
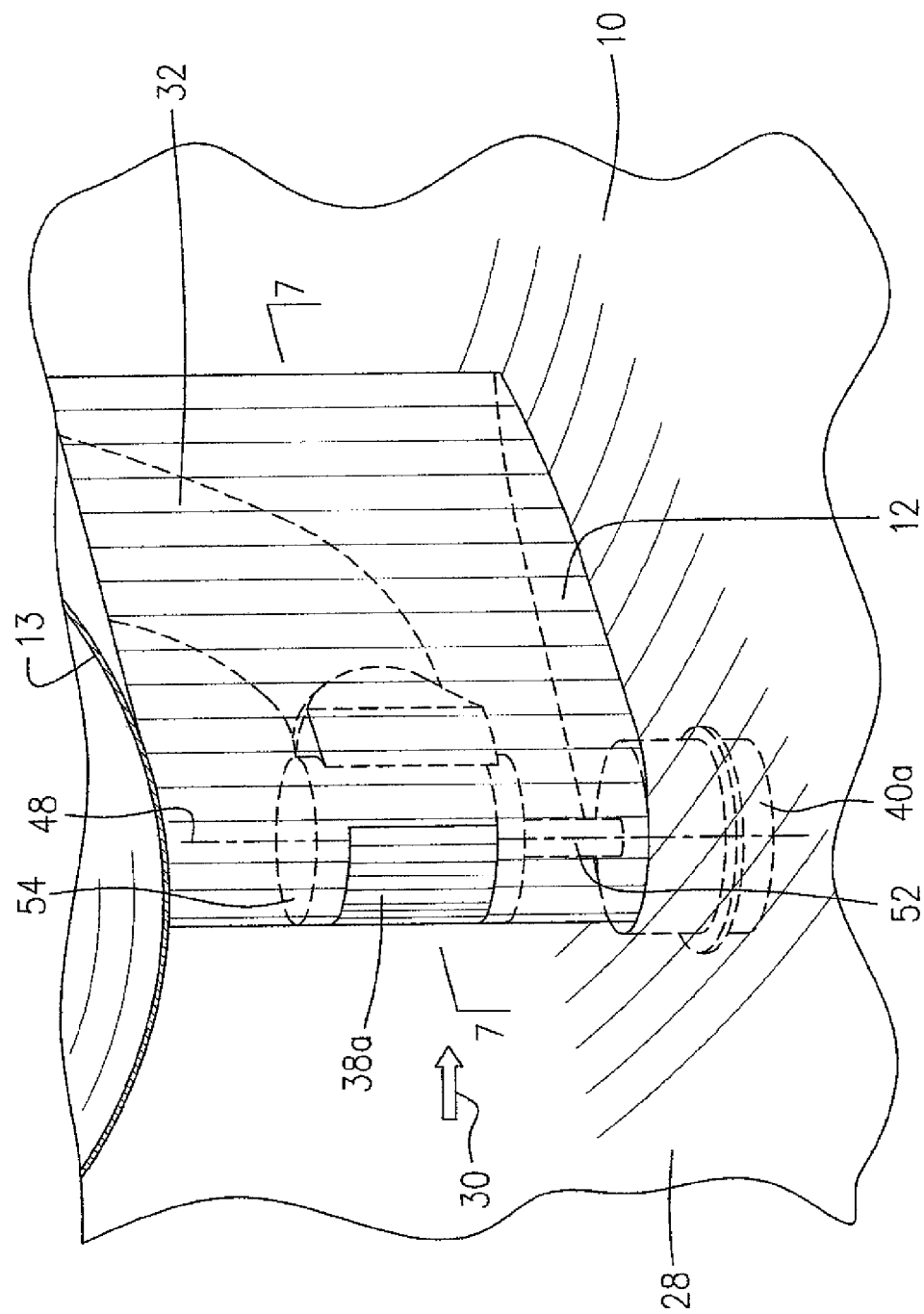
FIG. 6 illustrates the air scoop of FIG. 5 in a closed position.

The valve member 38a is rotatable about a radial axis 48 between a first position in which the opening (air scoop 36) is fully accessible for the scooped portion of the bypass air flow 30 to enter the air passage 32 (as shown in FIG. 5), and a second position in which the opening (air scoop 36) is completely blocked (as shown in FIG. 6). The valve member 38a in this embodiment may be positioned perpendicularly and may be affixed to a rotatable round plate 50 along a section of a peripheral edge thereof. The rotatable round plate 50 is supported by and connected to a rotating shaft 52 of the rotary valve actuator 40a such that the rotary valve actuator 40a is enabled to drive the rotatable valve member 38a in rotation about the radial axis 48 which is also the longitudinal axis of the radially extending rotating shaft 52, between an angular position A and a angular position B (see FIG. 7) which correspond to the open position as shown in FIG. 5 and closed position as shown in FIG. 6, respectively.

The rotatable round plate 50 may be sized and positioned such that at least a peripheral edge thereof substantially matches a leading area of the fairing of the radial strut 12 in order to allow the rotatable valve member 38a which is affixed thereto, to be positioned properly in order to satisfy the complete opening and complete closing functions. The cooling air passage 32 in this embodiment may include a cylindrical inlet end 54 the longitudinal axis of which is superposed with the longitudinal axis of the rotating shaft 52 of the rotary valve actuator 40a. The cylindrical inlet end 54 has a radially inner end (not numbered) which is closed and a radially outer end (not numbered) which is open. The cylindrical inlet end 54 is positioned and supported within the hollow configuration of the radial strut 12 such that the radially outer opening end of the cylindrical inlet end 54 is substantially closed by the rotatable round plate 50 but does not interfere with the rotation of the plate 50.

The diametrical dimension of the cylindrical inlet end 54 is slightly smaller than the diameter of the rotatable round plate 50 to thereby allow the rotatable valve member 38a affixed on the peripheral edge of the rotatable round plate 50 to rotate between the angular position A and angular position B (see FIG. 7) without interference. The cylindrical inlet end 54 defines an opening 36a in its cylindrical side wall (see FIG. 7), sized and shaped to substantially align with the opening (air scoop 36) defined in the air fairing of the radial strut 12, thereby offering no obstruction to the scooped portion of the bypass air flow 30 as it enters into the air passage 32.

Figure 7:
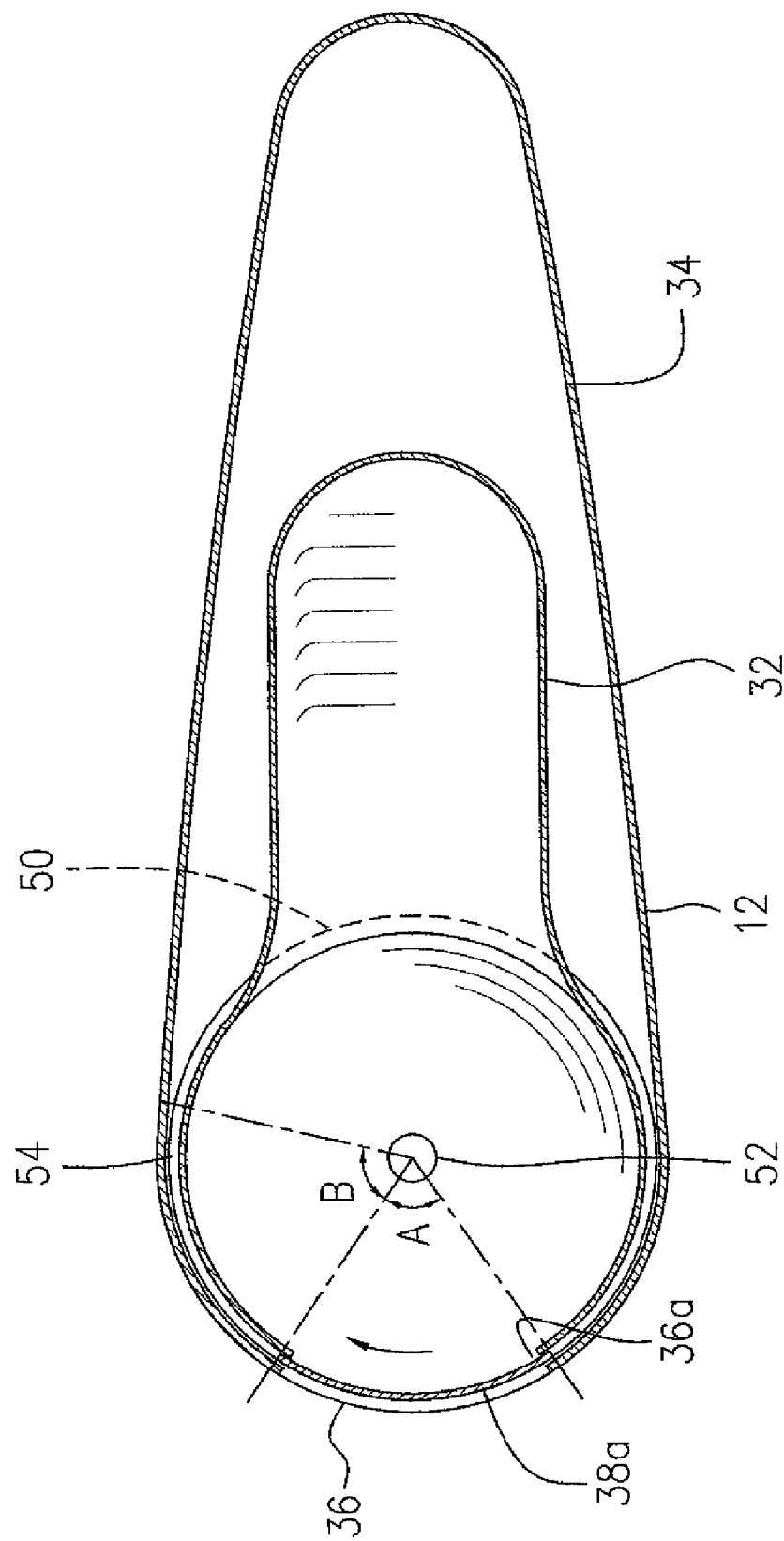
FIG. 7 is view similar to FIG. 4, taken along line 7-7 in FIG. 6.

As shown in FIGS. 5 and 7, the rotating shaft 52 of the rotary valve actuator 40a radially extends within the hollow configuration of the radial strut 12 while the rotary valve actuator 40a is positioned and supported outside of the annular bypass air duct 28, for example attached to the outside of the outer casing 10.

The above description is meant to be exemplary only, and one skilled in the art will recognize that changes may be made to the embodiments described without departing from the scope of the concept disclosed. For example, the valve member described in the embodiments, is slideable or rotatable and the valve actuator is a linear or rotary valve actuator, however any suitable valving arrangement may be used. It is also understood that although an ATCC system is described as an application of this concept, this concept can be used in any turbofan secondary air system fed by bypass air. Furthermore, this concept is applicable to an air duct of turbine engines of any type, and is not limited to a bypass duct of turbofan gas turbine engines. Still other modifications which fall within the scope of the described concept will be apparent to those skilled in the art, in light of a review of this disclosure, and such modifications are intended to fall within the appended claims.

What is claimed is:

1. A gas turbine engine comprising a fan assembly, a compressor assembly, a combustion gas generator assembly, a turbine assembly and an annular bypass air duct for directing a bypass air flow driven by the fan assembly to pass therethrough, the annular bypass air duct being defined between inner and outer duct walls, a plurality of struts radially extending between the inner and outer duct walls, at least one of the struts having an aerodynamic fairing located the bypass air duct, the at least one strut including an air scoop in the fairing, the air scoop defined at a mid span of the fairing and at a leading edge of the fairing, the air scoop in fluid communication with an air passage leading to the turbine assembly.

2. The gas turbine engine as defined in claim 1 wherein the at least one strut has a hollow portion accommodating a section of the air passage.

3. The gas turbine engine as defined in claim 1 wherein the air scoop is defined as an opening in a wall of the leading edge of the at least one strut.

4. The gas turbine engine as defined in claim 1 wherein the at least one strut comprises a valve for selectively closing the scoop.

5. The gas turbine engine as defined in claim 4 wherein the valve provides part of an outer perimeter of the fairing when the valve closes the scoop.

6. The gas turbine engine as defined in claim 5 wherein the valve is radially slidable between a first position in which the scoop is open and a second position in which the scoop is closed.

7. The gas turbine engine as defined in claim 5 wherein the valve is rotatable about a axis between a first position in which the scoop is open and a second position in which the scoop is closed.

8. A gas turbine engine comprising:
   an cooling air passage extending from an engine air duct to a turbine shroud for directing a portion of an air flow to the turbine shroud for selectively cooling the turbine shroud;
   an air scoop incorporated in an aerodynamic fairing of a strut radially extending within the air duct and in fluid communication with the cooling air passage, the air scoop being defined at a mid span of the air fairing and facing the air flow in order to scoop the portion of the air flow into the cooling air passage with a maximum dynamic pressure available in the air flow;
   a valve member for selectively completely opening and completely closing the air scoop; and
   an apparatus for controlling operation of the valve member.

9. The gas turbine engine as defined in claim 8 wherein the air duct is an annular bypass air duct for directing a bypass air flow.

10. The gas turbine engine as defined in claim 9 wherein the strut comprises a hollow configuration accommodating a section of the cooling air passage, the air scoop being defined as an opening in a wall of the strut.

11. The gas turbine engine as defined in claim 10 wherein the valve member is configured as a substantial part of the air fairing of the strut when the valve member closes the opening.

12. The gas turbine engine as defined in claim 10 wherein the valve member is radially slidable between a first position in which the opening is fully accessible for the scooped portion of the bypass air flow to enter the air passage and a second position in which the opening is completely blocked.

13. The gas turbine engine as defined in claim 10 wherein the valve member is rotatable about a radial axis, between a first position in which the opening is fully accessible for the scooped portion of the bypass air flow to enter the air passage and a second position in which the opening is completely blocked.

14. The gas turbine engine as defined in claim 10 wherein the means for controlling operation of the valve member comprises an valve actuator having a linkage extending within the hollow configuration of the strut to connect with the valve member for operation.

15. The gas turbine engine as defined in claim 14 wherein the valve actuator is controlled by an engine electronic controller (EEC).

* * * * *